United States Patent [19]

Kitamura et al.

[11] Patent Number: 4,818,591

[45] Date of Patent: Apr. 4, 1989

[54] THERMAL TRANSFER RECORDING MEDIUM

[75] Inventors: Shegehiro Kitamura; Masao Asano; Yoshiaki Shimizu; Takao Abe, all of Hino, Japan

[73] Assignee: Konishiroku Photo Industry Co., Ltd., Tokyo, Japan

[21] Appl. No.: 913,323

[22] Filed: Sep. 30, 1986

[30] Foreign Application Priority Data

| | | | |
|---|---|---|---|
| Oct. 7, 1985 | [JP] | Japan | 60-224046 |
| Jan. 30, 1986 | [JP] | Japan | 61-20984 |
| Feb. 7, 1986 | [JP] | Japan | 61-25069 |

[51] Int. Cl.4 .................... B32B 7/02

[52] U.S. Cl. .................... 428/216; 427/146; 428/213; 428/215; 428/336; 428/484; 428/488.1; 428/488.4; 428/913; 428/914

[58] Field of Search .................. 428/488.1, 488.4, 913, 428/914, 213-216, 195, 207, 336, 484; 427/146, 256, 258

[56] References Cited

U.S. PATENT DOCUMENTS

| | | | |
|---|---|---|---|
| 4,708,903 | 11/1987 | Tanaka et al. | 428/488.4 |

FOREIGN PATENT DOCUMENTS

| | | | |
|---|---|---|---|
| 73955 | 4/1984 | Japan | 428/488.4 |
| 165690 | 9/1984 | Japan | 428/488.4 |
| 127192 | 7/1985 | Japan | 428/488.4 |
| 60-166485 | 8/1985 | Japan | 428/488.4 |

*Primary Examiner*—George F. Lesmes
*Assistant Examiner*—P. R. Schwartz
*Attorney, Agent, or Firm*—Frishauf, Holtz, Goodman & Woodward

[57] ABSTRACT

There is disclosed a thermal transfer recording medium comprising a support, a layer containing an aqueous emulsion of a heat-fusible substance provided on the support and at least one colorant layer comprising an aqueous emulsion of a thermoplastic resin and a colorant provided on the layer containing an aqueous emulsion of a heat-fusible substance, the colorant layer having a film thickness of not more than 2 μm.

4 Claims, 1 Drawing Sheet

THERMAL TRANSFER RECORDING MEDIUM

BACKGROUND OF THE INVENTION

This invention relates to a thermal transfer recording medium, particularly to a thermal transfer recording medium which is capable of printing not only on a rough paper with low surface smoothness as a matter of course, but also on a paper with high surface smoothness at high density and at high quality, free from ground staining and yet excellent in blocking resistance.

In recent years, information processing systems have been remarkably developed, and also recording methods and devices suitable for respective systems have been developed and employed as accompanied with such developments. Among them, thermal recording methods have been widely used for advantages such as light weight and compactness of the device, no noise, excellent operability, and maintenance, etc.

However, among the recording papers used for thermal recording methods, ordinary thermal recording papers are expensive because they are chromogenic type containing a color former and a developer, and also involved drawbacks in aspect of maintenance such that the recording paper is readily susceptible to color formation with heat or an organic solvent or that the recorded image may be faded within a relatively short time.

As the method for improving the above drawbacks which is particularly attacting attention in these days is the thermal transfer recording method.

The thermal transfer recording method employs a thermal transfer recording medium having a heat-fusible colorant layer containing a colorant dispersed in a heat-fusible substance on an ordinarily sheet-shaped support, and heats said layer by a thermal head from the support side of the thermal transfer recording medium under the state with the colorant layer superposed on the medium on which to be transferred (generally paper), thereby forming an ink image corresponding to the heated shape through transfer of the molten colorant layer onto the medium on which to be transferred. According to this method, recording also only plain paper is rendered possible and the above drawbacks of thermal recording paper have been solved.

However, even the thermal transfer recording method involves the problem that the printed letter quality is influenced by the surface smoothness of the medium on which to be transferred. That is, while good printing can be effected on a medium on which to be transferred with high smoothness, printed letter quality will be markedly lowered when using a medium on which to be transferred with low smoothness. This is particularly an obstacle in the case when employing a paper which is the most typical medium on which to be transferred. That is, a paper with high smoothness is rather special and ordinary papers have considerable unevenness due to entanglements of fibers, and there is a portion of 10 μm or more from the upper end of convexity to the lower end of concavity in a rough paper with a Bekk smoothness of about 10 sec. When printing is performed by thermal transfer by use of such a paper, printing quality is greatly deteriorated, with the printing density being lower or a part of printing being defected.

For the purpose of improving this thermal transfer characteristic, it is conceivable to use a wax having low melting point for the heat-fusible substance in the heat-fusible colorant layer. However, although fusibility is elevated and substantial contact area with paper becomes greater as the progress of penetration, adhesive force between the colorant layer and paper is also lowered together with the cohesive force of the colorant layer, whereby no sufficient effect can be obtained but rather the colorant layer becomes tacky even at a relatively low temperature to give inconveniences such as lowering in storability as well as blurring of printed letters, staining of the non-printed portion (ground staining), etc. Also, in order to make greater the contact area because of essentially weak adhesive force between the colorant layer and paper, the film thickness of the colorant layer must be made thicker whereby blurring of printed letters may be increased or printing speed may be lowered because the amount of heat supplied to the thermal head is also required to be increased.

As another method for improving these drawbacks, it is well known to interpose a layer called as the adhesive layer or the peeling layer between the colorant layer and the support.

For enhancing sensitivity of a thermal transfer recording medium (capable of transfer at low energy) and also making it compact, the film thickness is preferably as thin as possible and studies in this aspect have been made for a long time. However, when a layer constitution of 2 or more layers is employed, the permissible range of the film thickness of each layer becomes extremely narrow and therefore its practical application can be done with difficulty based on the same design thought as in the case of one layer constitution.

Many attempts have been done for solving this problem. For example, as disclosed in Japanese Provisional Patent Publications No. 224392/1984 and No. 187593/1985, organic melt systems or hot melt systems have been employed, but no product with sufficiently satisfactory performance has yet been obtained.

Accordingly, it would be desirable to develop a thermal transfer recording medium which has improved the above drawbacks and can give good printing even on a rough paper with poor surface smoothness.

SUMMARY OF THE INVENTION

An object of the present invention is to provide a thermal transfer recording medium which is capable of printing of good printing quality even on a rough paper with poor surface smoothness.

Another object of the present invention is to provide a thermal transfer recording medium which is capable of transfer at low energy and giving clear printing on both rough paper and smooth paper.

Still another object of the present invention is to provide a thermal transfer recording medium which is capable of printing not only on a paper having a rough surface as a matter of course but also on a smooth paper at high density and high quality, free from ground staining and yet excellent in blocking resistance.

The present inventors have continued to study intensively about the relationship between the adhesive force and the cohesive force of the colorant layer and consequently found that, in a thermal transfer recording medium comprising a support, a layer containing an aqueous emulsion of a heat-fusible substance provided on said support and at least one colorant layer comprising an aqueous emulsion of thermoplastic resin and a colorant provided on said layer containing an aqueous emulsion of a heat-fusible substance, by making the film thickness of the above colorant layer not more than 2 μm, the above objects can be accomplished. The present invention has been accomplished based on such a finding.

DESCRIPTION OF THE PREFERRED EMBODIMENTS

Figure 1:
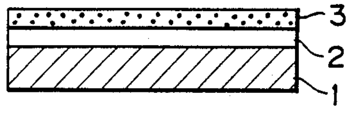
FIG. 1, FIG. 2, FIG. 3, FIG. 4, FIG. 5 and FIG. 6 are lateral sectional views observed in the thickness direction of the recording medium for illustration of the constitution of the thermal transfer recording medium according to the present invention.

The present invention is described in detail below.

The colorant layer should preferably have strong adhesive force with paper, weak adhesive force with support and also somewhat weak cohesive force when a thermal transfer recording medium is substantially departed from paper after application of energy. However, the cohesive force of colorant layer is generally correlated with adhesive force and it is difficult to satisfy both. The present inventors have found that the colorant layer can be formed with an aqueous emulsion very advantageously in a heat transfer system with lowered cohesive force, although adhesive force between the colorant layer and paper may be more or less lowered, as compared with the case when it is formed with a solvent system. Also, the fiber drawing phenomenon in shape of whiskers which is liable to occur at the edge portion of the printed letters with an ink formed mainly of a polymer in a solvent system will occur more scarcely in the emulsion system. Further, it has been found that the temperature at which blocking occurs is enhanced.

Also, it has been found that even if the cohesive force of the colorant layer may be strong, the same effect as when the cohesive force is weakened can be obtained by making its film thickness thinner, with its upper limit being 2 μm.

The layer containing an aqueous emulsion of a heat-fusible substance (in the present application, this is called heat-fusible layer) plays a role in controlling the adhesive force between the colorant layer and the support. That is, this layer should preferably maintain mechanical handling characteristics such as film sticking, film strength, etc., of the colorant layer when it is cold and weaken the adhesive force with the colorant layer when it is heated. The heat-fusible layer may be also transferred together with the colorant layer onto recording paper, but in that case the cohesive force of the heat-fusible layer and the cohesive force of the colorant layer are added, whereby the adhesive force between the colorant layer and recording paper is demanded to be further stronger. Therefore, it is preferable to effect peel-off between the heat-fusible layer and the colorant layer.

The film thickness of the heat-fusible layer may be thin, but particularly good printed letters can be obtained when it is thicker than the colorant layer. This may be considered to be due to the fact that, while substantial contact area with paper becomes smaller on account of unevenness if the colorant layer is thin, the thick layer absorbs unevenness of the paper at this portion to increase substantial contact area between the colorant layer and paper. The heat-fusible layer should preferably have a film thickness of 0.5 μm to 3.5 μm and thicker than that of the colorant layer.

The layer constitution of the thermal transfer recording medium of the present invention can be shown by FIG. 1 to FIG. 6. In FIG. 1 to FIG. 6, 1 is a support, 2 is a heat-fusible layer, 3 is a colorant layer, 4 is a sticking preventive layer and 5 is an adhesion controlling layer.

Figure 2:
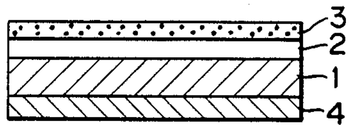
Figure 3:
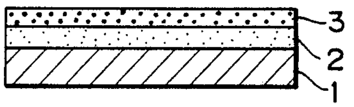
Figure 4:
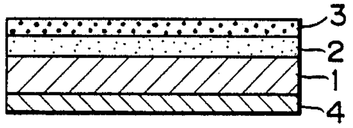

The colorant may be preferably contained only in the colorant layer as shown in FIG. 1 and FIG. 2, but it may be also added in a small amount in the heat-fusible layer as shown in FIG. 3 and FIG. 4.

Figure 5:
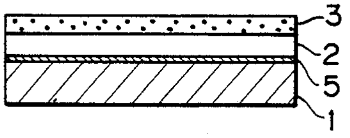
Figure 6:
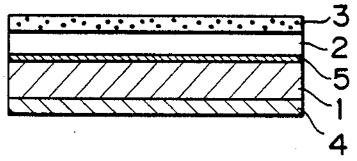

Also, as shown in FIG. 5 and FIG. 6, an adhesion controlling layer may be provided.

Also, in the present invention, in the thermal transfer recording medium having a plural number of layers with different compositions on a support, for at least one pair of adjacent two layers of the plural number of layers with different compositions as mentioned above, it is preferred that the ratio of the colorant layer to the heat-fusible layer is made 0.3 to 1.0.

Thus, when printing is performed with the thermal transfer recording medium of the present invention with a ratio of thickness of 0.3 to 1.0, sharp printing could be effected on a rough paper without defect at the edge portion, and further only the portion to be printed is transferred when printed on a smooth paper. As described above, when the ratio of thickness of the two layers is 0.3 to 1.0, good printing could be done on papers of any quality.

In contrast, if the thickness ratio is smaller than 0.3, sharpness of printed letter may be lowered or letter defect may be generated on a rough paper. On the other hand, if the ratio exceeds 1.0, transfer of non-printed portion is generated on a smooth paper. Thus, no printed letter of good quality can be obtained in both cases.

For the heat-fusible layer of the present invention, an aqueous emulsion of a heat-fusible substance is used. The heat-fusible substances to be used in the present invention may include solid or semi-solid substances at normal temperature, having a melting point (measured value according to Yanagimoto MPJ-2 model) or a softening point (measured value according to the ring and ball method) preferably of 25° to 150° C., more preferably 40° to 120° C. Specific examples may include vegetable waxes such as carnauba wax, wood wax, auricuri wax, expar wax, etc.; animal waxes such as bees wax, insect wax, shellac wax, whale wax, etc.; petroleum waxes such as paraffin wax, microcrystalline wax, polyethylene wax, ester wax, acid wax, etc.; mineral waxes such as montan wax, ozocerite, ceresine, etc., and other waxes; higher fatty acids such as palmitic acid, stearic acid, margaric acid, behenic acid, etc.; higher alcohols such as palmityl alcohol, stearyl alcohol, behenyl alcohol, margaryl alcohol, myrisyl alcohol, eicosanol, etc.; higher fatty acid esters such as cetyl palmitate, myrisyl palmitate, cetyl stearate, myrisyl stearate, etc.; amides such as acetamide, propionic acid amide, palmitic acid amide, stearic acid amide, amide wax, etc.; rosin derivatives such as ester gum, rosin maleic acid resin, rosin phenol resin, hydrogenated rosin, etc.; higher amines such as stearyl amine, behenyl amine, palmityl amine, etc. It is also possible to use "heat-fusible solid components which are solid at normal temperature" as disclosed in Japanese Provisional Patent Publication No. 68253/1979 or "vehicle" as disclosed in Japanese Provisional Patent Publication No. 105579/1980.

These heat-fusible substances can be easily formed into aqueous dispersions and preferably used.

These heat-fusible substances can be used either alone or as a mixture of two or more kinds.

For forming a heat-fusible substance into an aqueous emulsion, it may be emulsified into water in a system containing an emulsifier according to the existing method such as the phase transfer method, the high pressure emulsifying method, the sonication dispersing method, etc. The emulsifier may be either nonionic, anionic, cationic or amphoteric. Also, for obtaining film sticking property to the support during cold, an aqueous emulsion of a thermoplastic resin may be conveniently mixed with the aqueous emulsion of a heat-fusible substance.

Further, a substance which acts as the peeling agent may be conveniently mixed in the emulsion in order to reduce the adhesive force with the colorant layer under hot conditions.

In the present invention, the composition ratio of the components for forming the heat-fusible layer is not limited, but it is preferred to use 10 parts by weight or more (more preferably 30 parts by weight or more) per 100 parts by weight of the total amount of the solids in the heat-fusible layer.

Also, a colorant may be added in the heat-fusible layer, if desired. As the colorant, those as described below can be used. The amount of the colorant used may preferably be 20 parts by weight or less based on 100 parts by weight of the total amount of the solids in the heat-fusible layer.

In the heat-fusible layer of the present invention, various additives other than the above components may also be contained. For example, vegetable oils such as castor oil, linseed oil, olive oil, etc., animal oils such as whale oil and mineral oils may be preferably used. Also, surfactants such as anionic surfactants, cationic surfactants, nonionic surfactants, amphoteric surfactants may be preferably used.

Next, the thermoplastic resin to be used in the colorant layer of the present invention is to be explained. Examples of the thermoplastic resin may include polyamide resins, polyester resins, polyurethane resins, polyolefin resins, acrylic resins, vinyl chloride resins, cellulose resins, petroleum resins, ionomer resins, elastomers such as natural rubber, styrene-butadiene rubber, isoprene rubber, chloroprene rubber, etc.; rosin derivatives such as ester gum, rosin maleic acid resin, rosin phenol resin, hydrogenated rosin, etc., phenolic resins, terpene resins, xylene resins, aromatic hydrocarbon resins, polyethylene-polypropylene resins, etc.

An aqueous emulsion of a thermoplastic resin can be formed according to entirely the same method for formation of an aqueous emulsion of a heat-fusible substance, or alternatively it can be obtained also according to conventional emulsion polymerization method. Also, a considerably broad scope of aqueous emulsion are commercially available. Typical examples are shown below:

Polysol AP-691 (tade name, 2-ethylhexyl acrylate type), available from Showa Kobunshi;

Nippole LX-811 (tade name, acrylic acid ester type), available from Nippon Zeon;

Movinyl DM-60 (tade name, styrene-acrylic acid type), available from Hoechst Chemical;

JSR-2108 (tade name, styrene-butadiene type), available from Nippon Synthetic Rubber;

Byronal MD-1200 (tade name, polyester type), available from Toyobo;

Chemiparl S-100 (tade name, ionomer type), available from Mitsui Sekiyu Kagaku;

AD-37F1 (tade name, polyethylene type), available from Toyo Ink;

Zyxene A (tade name, ethylene-acrylic acid type), available from Seitetsu Kagaku;

Panphlex OM-5000 (tade name, ethylene-vinyl acetate type), available from Kuraray;

Hariester DS-90E (tade name, rosin type resin), available from Harima Kasei.

As more preferable polymers, acrylic resins may be employed. Acrylic resins are obtained by emulsion polymerization of mono-basic carboxylic acid such as acrylic acid, methacrylic acid, etc., or esters thereof and at least one copolymerizable monomer. Examples of carboxylic acid monomers may include methyl, ethyl, isopropyl, butyl, isobutyl, amyl, hexyl, octyl, 2-ethylhexyl, decyl, dodecyl, hydroxyethyl, hydroxypropyl esters, etc., of acrylic acid or methacrylic acid. On the other hand, examples of copolymerizable monomers may include vinyl acetate, vinyl chloride, vinylidene chloride, maleic anhydride, fumaric anhydride, styrene, 2-methylstyrene, chlorostyrene, acrylonitrile, vinyltoluene, N-methylolacrylamide, N-methylolmethacrylamide, N-butoxymethylacrylamide, N-butoxymethacrylamide, vinylpyridine, N-vinylpyrrolidone and the like. One kind or two or more kinds of these may be selected.

Diene type copolymers are also preferred, and there may be employed copolymers prepared by emulsion polymerization of diene type monomer such as butadiene, isoprene, isobutylene, chloroprene, etc., with copolymerizable monomers as mentioned above, such as butadiene-styrene, butadiene-styrene-vinylpyridine, butadiene-acrylonitrile, chloroprene-styrene, chloroprene-acrylonitrile and the like.

Also, as more preferable polymers, there are ethylene copolymers as exemplified by ethylene-vinyl acetate, ethylene-ethyl acrylate, ethylene-methyl methacrylate, ethylene-isobutyl acrylate, ethylene-acrylic acid, ethylene-vinyl alcohol, ethylene-vinyl chloride, ethylene-acrylic acid metal salt, etc.

Otherwise, polyurethane polymers and polyester polymers may be also used as the thermoplastic polymer.

An aqueous dispersion of a thermoplastic resin can be prepared according to the same method as the method for preparation of an aqueous dispersion of a heat-fusible substance, or alternatively it can also be obtained according to conventional emulsion polymerization technique.

In the present invention, the composition ratio of the components for forming the colorant layer is not limited, but it is preferred to use 5 to 40 parts by weight (more preferably 5 to 35 parts by weight) of a colorant and 5 to 95 parts by weight (more preferably 10 to 90 parts by weight) of a thermoplastic substance based on 100 parts by weight of the total amount of the solids in the colorant layer.

In the colorant layer of the present invention, various additives other than the above components may be also contained. For example, vegetable oils such as castor oil, linseed oil, olive oil, animal oils such as whale oil and mineral oils may be preferably used. Also, anionic, cationic, nonionic, amphoteric surfactants may be also preferably used.

The colorant to be used in the colorant layer of the present invention may preferably be carbon black or alternatively any of inorganic pigments, organic pigments or organic dyes may be used. Examples of inorganic pigments include titanium dioxide, carbon black, zinc oxide, prussian blue, cadmium sulfide, iron oxide and chromic acid salts of lead, zinc, barium and calcium. As the organic pigments, there may be included azo, thioindigo, anthraquinone, anthanthrone, triphenedioxazine type pigments, vat dye pigments, phthalocyanine pigments such as copper phthalocyanine and derivatives thereof and quinacridone pigments.

Organic dyes may be exemplified by acid dyes, direct dyes, disperse dyes, oil-soluble dyes, metal containing oil-soluble dyes, etc.

In the colorant layer of the present invention, various additives other than the above components may be also contained. For example, it is possible to use a thickener such as polysodium acrylate for controlling the viscosity of the aqueous emulsion or a substance for improving surface slipping property such as colloidal silica. Also, anionic, cationic, nonionic, amphoteric surfactants may be preferably used.

As the method for obtaining a coating solution by dispersing thermoplastic ink comprising a thermoplastic binder and a colorant as described above in water, any desired method may be basically employed. For example, the following methods can be employed.

(a) The method in which a thermoplastic binder and a colorant are melted and kneaded, and thereafter dispersed in water containing optionally a dispersing agent such as surfactants, etc.

(b) The method in which a thermoplastic binder and a colorant are respectively dispersed separately in water containing optionally a dispersing agent such as surfactants, etc., and these dispersions are mixed.

(c) The method in which a thermoplastic binder is dispersed in water containing optionally a dispersing agent such as surfactants, etc., and a colorant is added and mixed with the dispersion.

Among these methods, particularly the method (b) is preferred.

In the present invention, in addition to the above respective components, it is also possible to add a defoaming agent, an enhancer of wettability with the heat-fusible layer, etc.

The support to be used in the thermal transfer recording medium of the present invention should desirably be a support having high heat-resistant stength, dimensional stability and high surface smoothness. As the material, for example, there may be preferably employed either of papers such as plain paper, condenser paper, laminate paper, coated paper, etc., or resin films such as polyethylene, polyethyleneterephthalate, polystyrene, polypropylene, polyimide, etc., and paper-resin film composite, metal sheet such as aluminum foil, etc. The thickness of the support for obtaining good thermal conductivity should generally be about 60 μm or less, particularly preferably 1.5 to 15 μm. Further, the thermal transfer recording medium of the present invention may have any desired constitution at the backside of the support, and may be provided with a backing layer such as sticking prevention layer, etc.

In the thermal transfer recording medium of the present invention, the technique suitable for coating a support of a polymer film, etc., with constituent layers including a heat-fusible layer and a colorant layer is well known in this field of art, and these known techniques are also applicable for the present invention. For example, the constituent layer including the heat-fusible layer and the colorant layer is a layer formed by aqueous coating of an aqueous dispersion composition (latex). As the method for coating the constituent layer including the heat-fusible layer and the colorant layer of the present invention, there may be employed any desired technique such as the reverse roll coater method, the extrusion coater method, the gravure coater method or the wire bar coating method, etc.

The thermal transfer recording medium of the present invention may also have other constituent layers such as subbing layer (e.g. layer for controlling film sticking), and overcoat layer, etc.

The method for performing thermal transfer recording by use of the thermal transfer recording medium of the present invention is described below.

With the constituent layer surface of the thermal transfer recording medium of the present invention being superposed on a recording sheet such as plain paper, an energy is given from the thermal transfer recording medium side and/or the recording sheet side by means of a thermal recording device using a thermal head, a thermal pen or a laser corresponding to the information of an image, whereby the colorant layer contacts the recording paper by being given a relatively low energy and the colorant layer is transferred onto the recording paper when the thermal transfer recording medium is substantially separated from the recording paper.

By use of the thermal transfer recording medium of the present invention, the following effects can be obtained.

(1) Clear printing can be effected at high density even on a rough paper with low surface smoothness.

(2) During printing, there is no blurring, blotting or ground staining.

(3) Blocking resistance of the thermal transfer recording medium is improved.

EXAMPLES

The present invention is described below by referring to Examples, by which the present invention is not limited at all. In the following description, "parts" means "parts by weight".

Example 1

On a 3.5 μm polyethylene terephthalate film, the coating composition shown below was coated by a wire bar to a dried film thickness of 3.0 μm to form a heat-fusible layer of the present invention.

| | |
|---|---|
| Paraffin wax emulsion (emulsion having a paraffin wax with m.p. of 70° C. in water with a polyethyleneglycol monostearyl ether, solid content: 30%) | 85 parts |
| Ethylene-vinyl acetate copolymer emulsion (Adcoat AD-37P295, trade name, produced by Toyo Morton, solid content: 40%) | 11.25 parts |
| 2% aqueous solution of a fluorinated surfactant (FT-248, trade name, produced by Bayer Co.) | 2.5 parts |

As the next step, colorant layer compositions as shown in Table 1 were coated on the heat-fusible layer to a dried film thickness of 1.2 μm to obtain 8 kinds (I to VIII) of thermal transfer recording medium samples of the present invention, respectively.

TABLE 1

| Composition | Solid content of latex | Sample I | II | III | IV | V | VI | VII | VIII |
|---|---|---|---|---|---|---|---|---|---|
| Acrylic acid ester copolymer latex (Polysol AP-691, available from Showa Kobunshi) | 54% | 22.2 | 13.3 | 17.8 | | | | | |
| Acrylic acid ester copolymer latex (Polysol AP-2801, available from Showa Kobushi) | 43% | | | | 16.7 | | | | |
| Ethylene-vinyl acetate copolymer latex (Adcoat AD-37P295, available from Toyo Morton) | 40% | | 12 | | 12 | | | | |
| Ethylenic copolymer latex (Adcoat AD-37F1, available from Toyo Morton) | 22% | | | 10.9 | | 54.5 | | | |
| Polyester type latex (Byronal MD-1200, available from Toyobo) | 34% | | | | | | 35.3 | | |
| Rubber type latex (JSR-0693, available from Nippon Gosei Gomu) | 48% | | | | | | | 25 | |
| Ionomer latex (Chemipearl S-100, available from Mitsui Sekiyu Kagaku) | 27% | | | | | | | | 44.4 |
| Carbon black water dispersion | 30% | 10 | 10 | 10 | 10 | 10 | 10 | 10 | 10 |
| Water | — | 62.8 | 59.7 | 56.3 | 56.3 | 30.5 | 49.5 | 60 | 40.6 |
| Fluorinated surfactant (2% solution) | — | 5 | 5 | 5 | 5 | 5 | 5 | 5 | 5 |

Recording (printing) was performed with these thermal transfer recording medium samples on plain paper and rough paper by means of a thermal printer (trial machine with 24 dot serial head, printing pressure of 600 g/head, platen rubber hardness of 50°). As the plain paper, a commercially available copying paper (Bekk smoothness: 30 sec) and a bond paper (Bekk smoothness: 10 sec) was used as the rough paper. On either one of the papers, clear printed letters were obtained without blurring, blotting or ground staining. Also, these thermal transfer recording samples did not cause blocking when stored for a long term.

Comparative Example 1

When printing was performed in the same manner as in Example 1 by use of a thermal transfer recording medium sample obtained by coating the colorant layer in Example 1 to a thickness of 3.0 μm, substantially no printing was effected or marked printing omission occurred in all the samples.

Comparative Example 2

When printing was performed in the same manner as in Example 1 by use of a thermal transfer recording medium sample obtained by coating an ink composition dissolved and dispersed in methyl ethyl ketone/toluene solvent mixture in place of water to the same thickness of 1.2 μm as in Example 1, marked whisker was generated at the edge portion of the printed letter. Also, these thermal transfer recording medium samples suffered from marked blocking during storage.

Comparative Example 3

In the coating composition for the heat-fusible layer in Example 1, toluene was used in place of water and the composition was coated under heating to form a heat-fusible layer. When the ink compositions in Table 1 were coated on this heat-fusible layer, marked repellent phenomenon occurred to give no satisfactory thermal transfer recording medium.

Comparative Example 4

On a 3.5 μm polyethylene terephthalate film, a solution having the following composition was coated by a wire bar to a dried film thickness of 2.5 μm to form a heat-fusible layer.

| | |
|---|---|
| Paraffin wax (m.p. 54° C.) | 9 parts |
| Ethylene-vinyl acetate copolymer (Melt index 400, trade name, softening point 88° C., vinyl acetate content: 20%) | 1 part |
| Toluene | 90 parts |

Next, 10 parts of the following composition was dissolved and dispersed in 10 parts of toluene (dispersed for 24 hours in a hot type ball mill) to prepare a colorant layer coating solution.

| | |
|---|---|
| Ester wax (m.p. 74 to 80° C.) | 1 part |
| Ethylene-vinyl acetate copolymer (the same as described above) | 2 parts |
| Acrylic resin (2-ethylhexyl methacrylate-methyl methacrylate copolymer, molecular weight: 20,000) | 16 parts |
| Partially disproportionated rosin modified resin | 1 part |
| Carbon black | 3 parts |

This coating solution was coated on the above heat-fusible layer by a wire bar to a dried film thickness of 2 μm to obtain a thermal transfer recording medium sample (S - 1).

Next, according to entirely the same procedure as described above except for making the dried film thickness of the heat-fusible layer 3.7 μm, a sample (S - 2) was obtained.

Example 2

On a 3.4 μm polyethylene terephthalate film, a solution having the following composition was coated by a wire bar to form heat-fusible layers with dried film thicknesses of 1.5 μm, 2.5 μm and 3.0 μm, respectively.

| | |
|---|---|
| Aqueous paraffin wax dispersion (m.p. 65° C.) | 80% (calculated on solid) |

-continued

| | |
|---|---|
| Ethylene-vinyl acetate copolymer (EVA) latex (VA content: 22%, molecular weight: about 30,000) | 15% (calculated on solid) |
| Aqueous polyethylene glycol mono-vehenate dispersion (molecular weight of PEG: 4,000) | 4% (calculated on solid) |
| Surfactant | 1% (calculated on solid) |

Further, the following composition was coated on the above coated samples respectively to obtain to a dried film thickness of 1.5 μm to obtain thermal transfer recording medium samples (A - 1), (A - 2) and (A - 3).

| | |
|---|---|
| Aqueous carbon dispersion (30%) | 16% (calculated on solid) |
| 2-Ethyl hexyl acrylate-methyl methacrylate copolymer latex | 65% (calculated on solid) |
| EVA type latex (VA content: 25%, molecular weight: about 30,000) | 16% (calculaetd on solid) |
| Surfactant | 3% (calculated on solid) |

Example 3

On a 3.4 μm polyethylene terephthalate film, a solution having the following composition was coated by a wire bar to form heat-fusible layers with dried film thicknesses of 2.2 μm, 2.5 μm and 2.9 μm, respectively.

| | |
|---|---|
| Aqueous paraffin wax-nonionic surfactant (weight ratio 9:1) dispersion | 84% (calculated on solid) |
| Ethylene-vinyl acetate copolymer (EVA) latex (VA content: 22%, molecular weight: about 30,000) | 15% (calculated on solid) |
| Extender | 1% (calculated on solid) |

Further, the following composition was coated on the above coated samples respectively to a dried film thickness of 2.1 μm to obtain thermal transfer recording medium samples (B - 1), (B - 2) and (B - 3).

| | |
|---|---|
| Aqueous carbon black dispersion (30%) | 16% (calculated on solid) |
| 2-Ethyl hexyl acrylate-methyl methacrylate-styrene copolymer latex | 65% (calculated on solid) |
| EVA type latex (VA content: 25%, molecular weight about: 30,000) | 16% (calculated on solid) |
| Extender | 3% (calculated on solid) |

Comparative Example 5

In the same manner as in Example 3 except for changing the film thickness of the heat-fusible layer to 0.4 μm and 3.6 μm, two kinds of thermal transfer recording medium samples (S - 3) and (S - 4) were obtained.

These thermal transfer recording medium samples were used to perform printing on a rough paper (Bekk smoothness: 10 sec) and a smooth paper (Bekk smoothness: 200 sec) by means of a thermal printer (trial machine mounted with a thin film type serial head with a heat generating element density of 7 dot/mm) by giving an application energy of 1.0 mj/dot. The results are shown in Table 2.

TABLE 2

| Sample | Printed letter quality: Rough paper | Smooth paper |
|---|---|---|
| S-1 (Comparative) | X | O |
| S-2 (Comparative) | X | Δ |
| A-1 (This invention) | O | O |
| A-2 (This invention) | O | O |
| A-3 (This invention) | O | O |
| B-1 (This invention) | O | O |
| B-2 (This invention) | O | O |
| B-3 (This invention) | O | O |
| S-3 (Comparative) | X | Δ |
| S-4 (Comparative) | X | Δ |

Printed letter quality was evaluated at 3 ranks by visual observation.
O . . . clear alphabet reproduced
Δ . . . alphabet reproduced slightly unclearly
X . . . alphabet reproduced unclearly As is apparent from Table 2, it can be understood that only the thermal transfer recording medium samples having the heat-fusible layers within the film thickness range of the present invention can give good printed letter quality on both rough paper and smooth paper.

Example 4

On a 3.5 μm thick polyethylene terephthalate film, the following coating composition was coated to form heat-fusible layers with various dried film thicknesses as shown in Table 3.

| | |
|---|---|
| Aqueous paraffin wax (m.p. 70° C.) dispersion (solid 30%) | 95 parts |
| Ethylene-vinyl acetate copolymer latex (vinyl acetate content: 25%, solid: 40%) | 4 parts |
| Surfactant (fluorine type, 2% aqueous solution) | 2 parts |

On these heat-fusible layers, the colorant layer coating composition shown below was coated by a wire bar and dried to obtain thermal transfer recording medium samples. However, dried film thickness was varied as shown in Table 3, respectively.

| | |
|---|---|
| 2-Ethylhexyl acrylate-methyl methacrylate-styrene copolymer latex (solid: 54%) | 19 parts |
| Aqueous carbon black dispersion (solid: 32%) | 10 parts |
| Surfactant (fluorine type, 2% aqueous solution) | 3 parts |
| Water | 26 parts |

TABLE 3

| Sample | Film thickness: Heat-fusible layer a (μm) | Thermoplastic layer b (μm) | b/a |
|---|---|---|---|
| 4-1 (This invention) | 1.8 | 1.6 | 0.89 |
| 4-2 (This invention) | 2.8 | 1.5 | 0.54 |
| 4-3 (Comparative) | 2.0 | 4.0 | 2.00 |
| 4-4 (Comparative) | 3.5 | 1.0 | 0.28 |

Example 5

On a 3.5 μm thick polyethylene terephthalate film, the following coating composition was coated to form heat-fusible layers with various dried film thicknesses as shown in Table 4.

| | |
|---|---|
| Aqueous carnauba wax (m.p. 80° C.) dispersion (solid: 30%) | 80 parts |
| Ethylene-vinyl acetate copolymer latex (vinyl acetate content: 25%, solid: 40%) | 16 parts |
| Surfactant (fluorine type, 2% aqueous solution) | 2 parts |

On the heat-fusible layers, the following composition was coated by a wire bar to form colorant layers with dried film thicknesses as shown in Table 4, respectively. To prepare a thermal transfer recording medium samples.

| | |
|---|---|
| 2-Ethylhexyl acrylate-styrene copolymer latex (solid: 42%) | 18 parts |
| Ethylene-vinyl acetate copolymer latex (vinyl acetate content: 25%, solid: 40%) | 8 parts |
| Aqueous carbon black dispersion (solid: 32%) | 10 parts |
| Surfactant (fluorine type, 2% aqueous solution) | 3 parts |
| Water | 21 parts |

TABLE 4

| | Film thickness | | |
|---|---|---|---|
| Sample | Heat-fusible layer a (μm) | Thermoplastic layer b (μm) | b/a |
| 5-1 (This invention) | 2.3 | 2.0 | 0.87 |
| 5-2 (This invention) | 3.2 | 1.5 | 0.47 |
| 5-3 (Comparative) | 2.0 | 3.0 | 1.50 |
| 5-4 (Comparative) | 5.0 | 1.4 | 0.28 |

The thermal transfer recording medium samples obtained in Examples 4 and 5 were used to perform printing on a rough paper (Bekk smoothness: 4 sec) and a plain paper (Bekk smoothness: 100 sec) by means of a thermal printer (trial machine mounted with a thin film type serial head with a heat-generating element density of 7 dot/mm) by giving an application energy of 1.0 mj/dot. The results are shown in Table 5.

TABLE 5

| | Printed letter quality | |
|---|---|---|
| Sample | Rough paper | Smooth paper |
| 4-1 (This invention) | Good | Good |
| 4-2 (This invention) | Good | Good |
| 4-3 (Comparative) | Letter defect and transfer omission generated | Good |
| 4-4 (Comparative) | Good | Transfer generated at non-printed portion |
| 5-1 (This invention) | Good | Good |
| 5-2 (This invention) | Good | Good |
| 5-3 (Comparative) | Letter defect and transfer omission generated | Good |
| 5-4 (Comparative) | Good | Transfer generated at non-printed portion |

As is also apparent from Table 5, the samples of the present invention can give good printed letters on both papers with low surface smoothness and high surface smoothness.

We claim:

1. A thermal transfer recording medium, comprising a support, a heat-fusible layer formed from an aqueous emulsion of a heat-fusible substance coated on said support and dried; and at least one colorant layer formed from an aqueous emulsion of a thermoplastic resin and a colorant coated on said layer and thereafter dried said colorant layer having a film thickness of not more than 2 μm.

2. The thermal transfer recording medium of claim 1, wherein said heat-fusible layer has a film thickness which is thicker than the film thickness of the colorant layer.

3. The thermal transfer recording medium of claim 2, wherein the thickness of said heat-fusible layer is within the range of from 0.5 μm to 3.5 μm.

4. The thermal transfer recording medium of claim 1, wherein the ratio or the thickness of said colorant layer to the thickness of said heat-fusible layer is 0.3 to 1.0.

* * * * *